US010581302B2

(12) United States Patent
Schmid

(10) Patent No.: US 10,581,302 B2
(45) Date of Patent: Mar. 3, 2020

(54) STATOR FOR AN ELECTRIC MOTOR

(71) Applicant: Nidec Corporation, Kyoto (JP)

(72) Inventor: Juergen Schmid, Bietigheim-Bissingen (DE)

(73) Assignee: NIDEC CORPORATION, Kyoto (JP)

( * ) Notice: Subject to any disclaimer, the term of this patent is extended or adjusted under 35 U.S.C. 154(b) by 243 days.

(21) Appl. No.: 15/787,793

(22) Filed: Oct. 19, 2017

(65) Prior Publication Data

US 2018/0152083 A1 May 31, 2018

(30) Foreign Application Priority Data

Aug. 19, 2016 (DE) .................. 10 2016 115 455

(51) Int. Cl.
*H02K 1/00* (2006.01)
*H02K 15/00* (2006.01)
(Continued)

(52) U.S. Cl.
CPC ..... *H02K 15/0037* (2013.01); *F16C 32/0474* (2013.01); *H02K 3/28* (2013.01);
(Continued)

(58) Field of Classification Search
CPC ........ H02K 3/28; H02K 2203/09; H02K 3/38; H02K 15/0037; H02K 15/0081;
(Continued)

(56) References Cited

U.S. PATENT DOCUMENTS 3,809,937 A * 5/1974 Koike ............... H02K 3/28
310/184
6,703,747 B2 * 3/2004 Kawamura ......... H02K 3/28
310/179
(Continued)

FOREIGN PATENT DOCUMENTS

DE 11 2007 000 749 T5 1/2009
DE 10 2013 201 820 A1 8/2013
(Continued)

OTHER PUBLICATIONS

Office Action received for German Application No. 10 2016 115 455.5 dated May 11, 2017, 17 pages (Information Purpose Only).

*Primary Examiner* — Thanh Lam
(74) *Attorney, Agent, or Firm* — Viering, Jentschura & Partner MBB

(57) ABSTRACT

A stator for an electric motor may have a substantially annular shape centered around a central axis and may include a stator core having a plurality of teeth consecutively arranged in a circumferential direction, and a plurality of coils wound around respective teeth of the plurality of teeth. The plurality of coils may be grouped into a plurality of phase groups. The stator may include in association with the respective phase groups: at least one loop wire connecting at least two coils of the respective phase group in series with each other with the at least one loop wire being positioned at a radially inner portion of the stator, and at least two end wires respectively connected to two end coils of the respective phase group. The at least two end wires may be
(Continued)

configured to be connected to a power source to energize the coils of the respective phase group.

22 Claims, 9 Drawing Sheets

(51) Int. Cl.
    | | | |
    |---|---|---|
    | *H02K 3/28* | (2006.01) | |
    | *H02K 3/52* | (2006.01) | |
    | *F16C 32/04* | (2006.01) | |
    | *H02K 3/38* | (2006.01) | |
    | *H02K 5/22* | (2006.01) | |
    | *H02K 15/085* | (2006.01) | |
    | *H02K 15/10* | (2006.01) | |

(52) U.S. Cl.
    CPC ............... *H02K 3/38* (2013.01); *H02K 3/522* (2013.01); *H02K 3/525* (2013.01); *H02K 5/225* (2013.01); *H02K 15/085* (2013.01); *H02K 15/105* (2013.01); *H02K 2203/06* (2013.01)

(58) Field of Classification Search
    CPC ...... H02K 15/064; H02K 3/522; H02K 5/225; H02K 15/0414; H02K 15/0435; H02K 17/12
    USPC ... 310/71, 179–180, 184–185, 198, 201–208
    See application file for complete search history.

(56) References Cited

U.S. PATENT DOCUMENTS

| | | | |
|---|---|---|---|
| 7,557,483 B2* | 7/2009 | Yasuhara | H02K 3/28 310/184 |
| 2007/0182271 A1* | 8/2007 | Sugishima | H02K 1/148 310/216.012 |
| 2009/0039720 A1 | 2/2009 | Tsukashima et al. | |
| 2009/0309452 A1* | 12/2009 | Tao | H02K 3/28 310/198 |
| 2013/0162098 A1* | 6/2013 | Furuhashi | H02K 3/38 310/215 |
| 2013/0200742 A1 | 8/2013 | Seki et al. | |

FOREIGN PATENT DOCUMENTS

| | | |
|---|---|---|
| JP | 2013-176272 A | 9/2013 |
| JP | 2014-225983 A | 12/2014 |

\* cited by examiner

STATOR FOR AN ELECTRIC MOTOR

CROSS-REFERENCE TO RELATED APPLICATION

This application claims priority to German Patent Application Serial No. 10 2016 115 455.5, which was filed Aug. 19, 2016, and is incorporated herein by reference in its entirety.

TECHNICAL FIELD

Various embodiments relate generally to a stator for an electric motor, and to a method of manufacturing a stator for an electric motor.

BACKGROUND

Electric motors have gained significant importance in modern life and have become essential parts in a large variety of driving systems. A key parameter of a driving system of this kind that is subject to permanent optimization is the volume thereof. The optimization of this parameter is of particular importance for driving systems employed in mobile environments such as in vehicles.

The volume of electric motors, in particular in a radial direction thereof, is mainly determined by the configuration of the respective stators mounted therein. An object of the present invention is, therefore, the provision of a stator for an electric motor having a compact structure.

SUMMARY

According to various embodiments, a stator for an electric motor is provided. The stator may have a substantially annular shape centered around a central axis and may include a stator core having a plurality of teeth consecutively arranged in a circumferential direction, and a plurality of coils wound around respective teeth of the plurality of teeth. The plurality of coils may be grouped into a plurality of phase groups. The stator may include in association with the respective phase groups: at least one loop wire connecting at least two coils of the respective phase group in series to each other with the at least one loop wire being positioned at a radially inner portion of the stator, and at least two end wires respectively connected to two end coils of the respective phase group. The at least two end wires may be configured to be connected to a power source to energize the coils of the respective phase group.

According to various embodiments, a method of manufacturing a stator for an electric motor is provided. The method may include: providing a plurality of sets of consecutively arranged separate stator teeth, winding respective winding wires around the teeth of the respective sets of stator teeth to form a plurality of sets of consecutively arranged coils wound around the teeth, and to connect two immediately consecutive coils of the respective sets by a respective loop wire, joining the different sets of teeth to an annular structure such that at least one of the loop wires is positioned at a radially inner portion of the annular structure, and fixing the teeth to each other.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
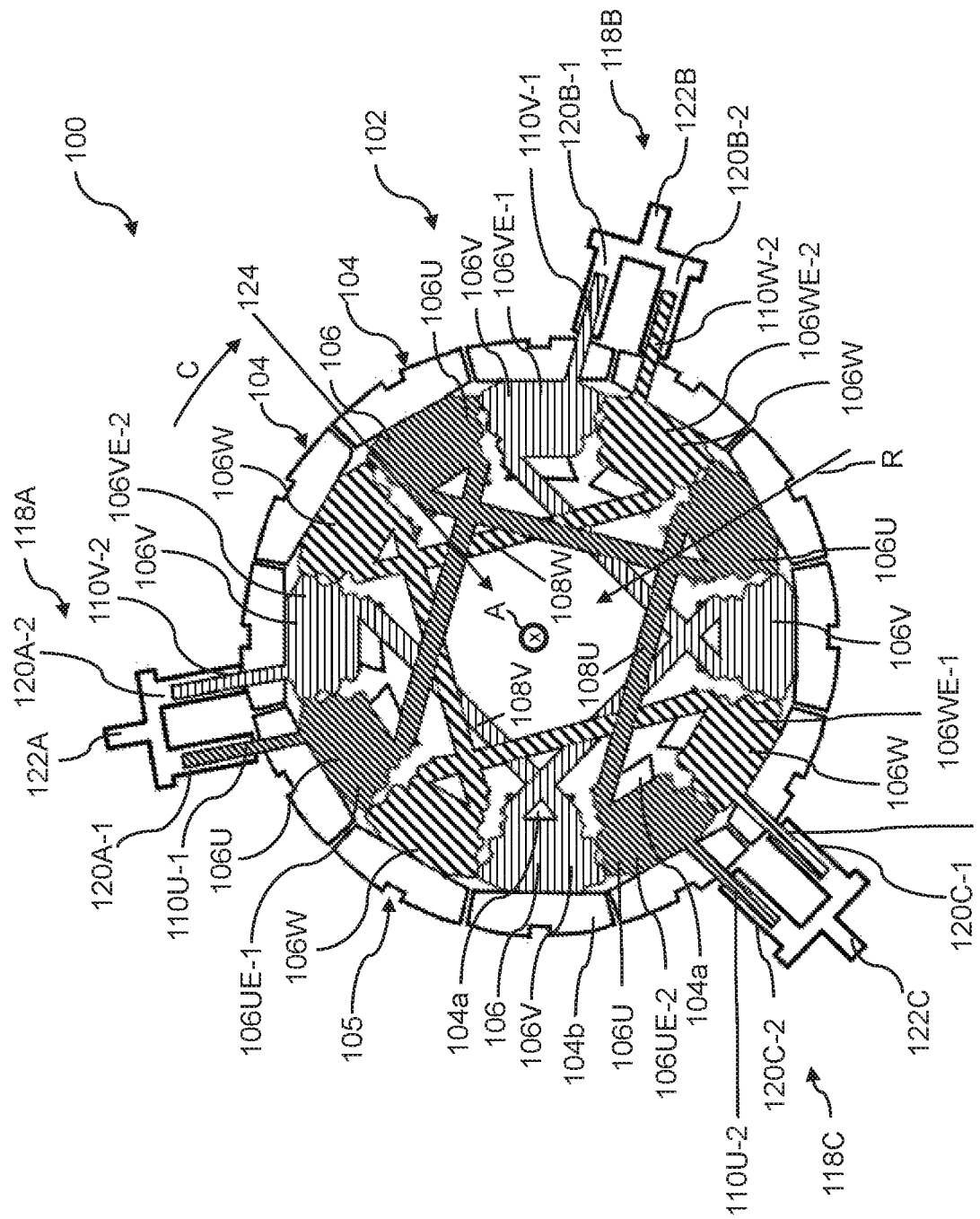
FIG. 1 shows a schematic plan view of a stator for an electric motor.
Figure 2:
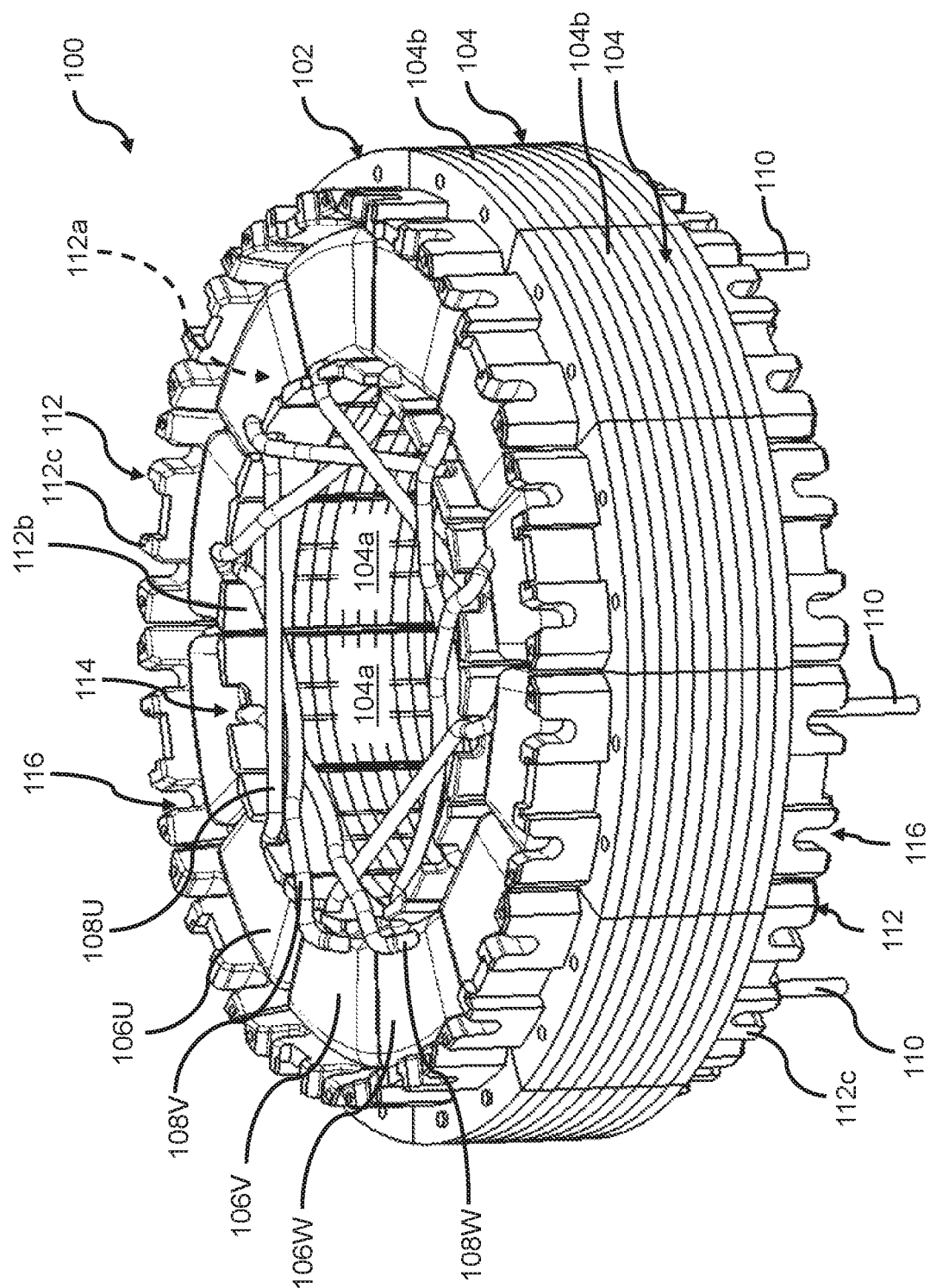
FIG. 2 shows a perspective view of a stator for an electric motor.
Figure 3:
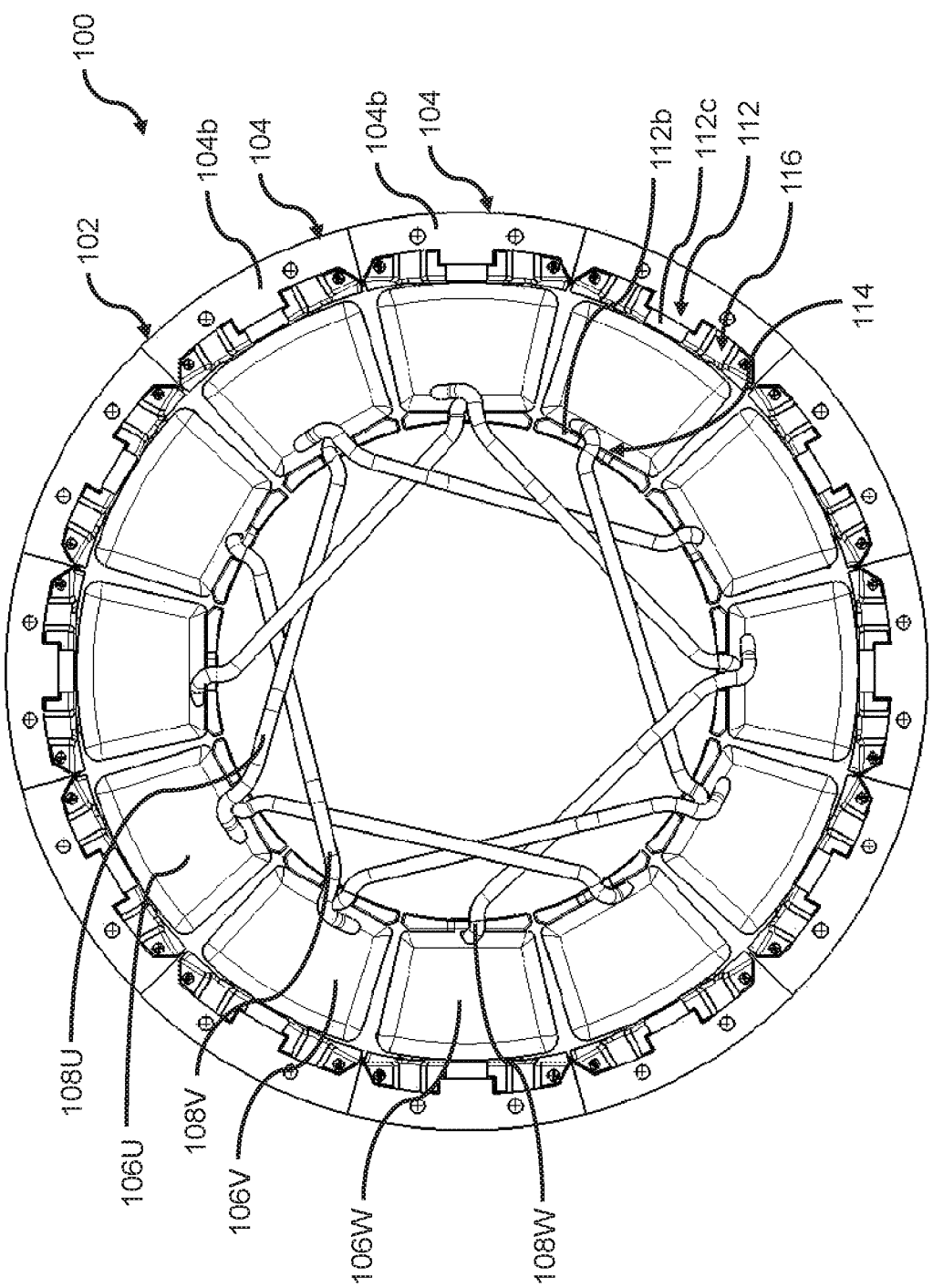
FIG. 3 shows a top view of the stator shown in FIG. 2.
Figure 4:
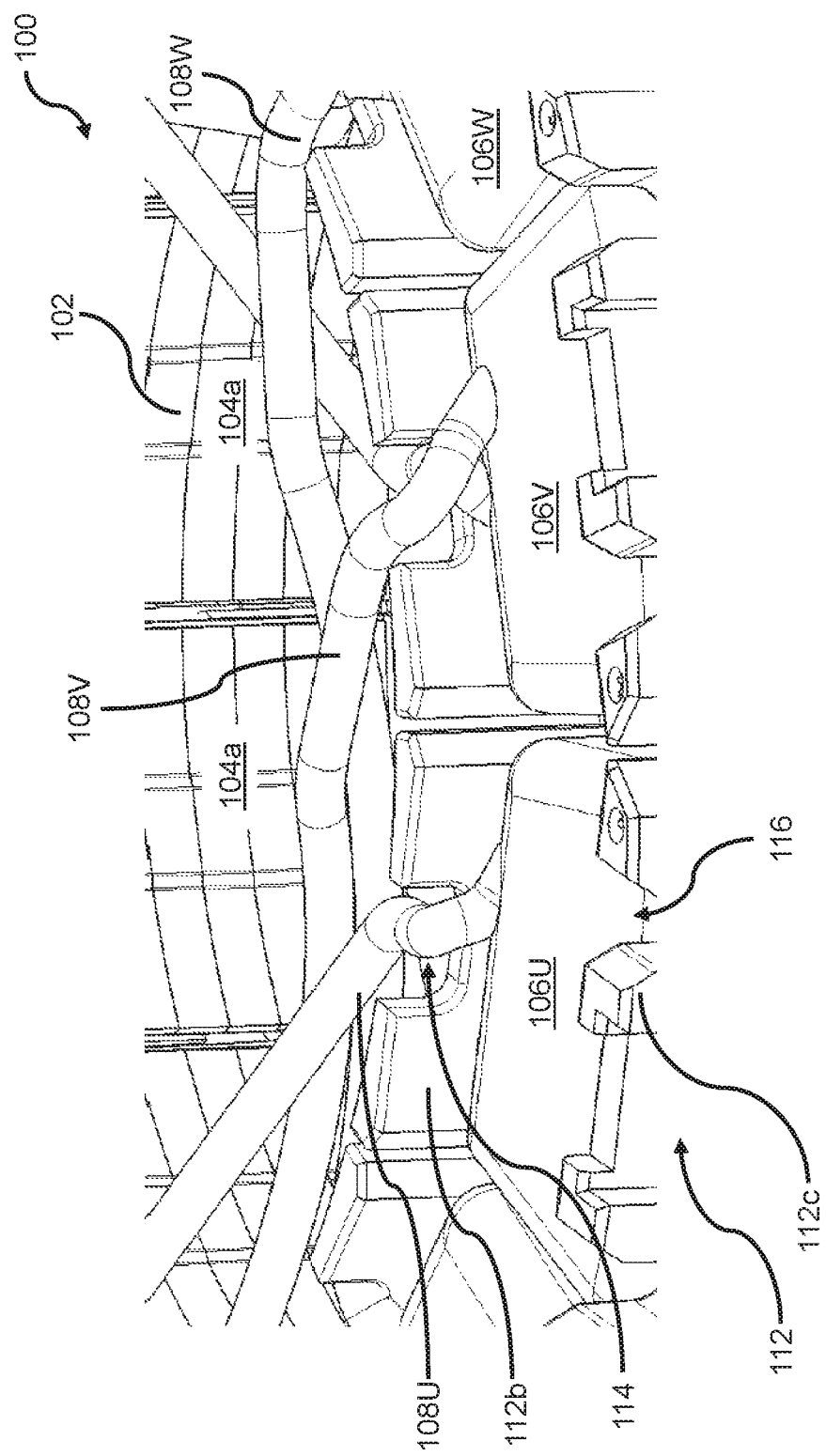
FIG. 4 shows an enlarged view of an outer circumferential portion of the stator shown in FIGS. 2 and 3.

FIG. 1 shows a schematic top view of a stator 100 for an electric motor. A perspective view of the stator 100 is shown in FIG. 2. A further top view of the stator 100 with more details as compared to FIG. 1 is shown in FIG. 3. FIG. 4 shows an enlarged view of an outer circumferential portion of the stator 100 shown in FIGS. 2 and 3.

As indicated in FIGS. 1 to 3, the stator 100 may have a substantially annular shape centered around a central axis A. The stator 100 may include a stator core 102 having a plurality of core teeth (core segments) 104 consecutively arranged in a circumferential direction C of the stator 100, and a plurality of coils 106 wound around respective teeth 104 of the plurality of teeth 104.

The stator 100 may be mounted in an electric motor (not shown). The motor may include a housing inside of which the stator 100 may be fixedly mounted and configured to generate a time-varying magnetic field by means of the plurality of coils 106. The motor may further include a magnetized rotor rotatably mounted inside of the housing and configured to be rotated by an interaction with the time-varying magnetic field generated by the stator 100.

The electric motor may be part of a hydraulic pump. The hydraulic pump may be configured to convey a service liquid in a vehicle such as lubricating oil or a coolant, e.g. cooling water. The pump may be, hence, configured as an electric oil pump or as an electric water pump.

The plurality of coils 106 may be grouped into a plurality of phase groups. In the exemplary embodiment shown in FIG. 1, the plurality of coils 106 are grouped into three phase groups U, V, W which are hereinbelow referred to as U-, V-, and W-phase groups, respectively. The coils associated with the respective phase groups U, V, W will be denoted by the reference characters 106U, 106V, 106W, respectively. The coils 106U, 106V, 106W of a given phase group U, V, W are electrically connected in series to each other.

As shown in FIG. 1, the stator 100 may include in association with each phase group U, V, W loop wires (connection wires) 108U, 108V, 108W, electrically connecting two consecutive coils 106U, 106V, 106W of the respective phase groups U, V, W in the circumferential direction C of the stator 100 in series to each other. The respective loop wires 108U, 108V, 108W may be positioned at a radially inner portion of the stator 100. In this way, the dimensions of the stator 100 in the radial direction R thereof is not increased by the loop wires 108U, 108V, 108W. Consequently, in this way, a stator 100 with a compact structure at least in the radial direction R can be provided.

As indicated in FIGS. 1 and 2, at least one core tooth 104, a plurality of core teeth 104, or even all core teeth 104 may include a winding portion 104a around which the respective coil 106 or coils 106 is/are wound. The winding portion 104a may be configured as an elongated member mainly extending in the radial direction R of the stator 100.

At least one core tooth 104, a plurality of core teeth 104 or even all core teeth 104 may also include a flange portion 104b physically connected to a respective winding portion 104a of said tooth/teeth 104 and positioned at a radially outer end of the respective winding portion 104a. The winding portion 104a and the flange portion 104b of at least one tooth 104 may be integrally formed. The flange portions 104b may serve as a positioning means for accurately defining the radial outer position of the coils 106 wound around the respective winding portions 104a. As shown in FIGS. 2 and 3, the flange portions 104b of two immediately adjacent teeth 104 in the circumferential direction C of the stator 100 may be in physical contact with each other and fixed to each other, e.g., by welding.

The flange portion 104b of at least one core tooth 104, of a plurality of core teeth 104, or of even all core teeth 104 may include a continuous groove 105 extending in the axial direction A of the stator 100. The groove 105 may serve, e.g., as a positioning means for positioning the stator 100 inside of a housing of an electric motor.

As also shown in FIG. 1, the stator 100 may further include end wires 110U-1, 110U-2, 110V-1, 110V-2, 110W-1, 110W-2 respectively connected to end coils 106UE-1, 106UE-2, 106VE-1, 106VE-2, 106WE-1, 106WE-2 of the respective phase groups U, V, W. The respective end wires 110U-1, 110U-2, 110V-1, 110V-2, 110W-1, 110W-2 may be configured to be electrically connected to a power source (not shown) to energize the coils 106U, 106V, 106W of the respective phase groups U, V, W, e.g., by an alternating voltage to generate a time-varying magnetic field. As previously mentioned, a magnetized rotor (not shown) may be rotated by an interaction with the time-varying magnetic field. The rotor may be mounted in the inner opening 124 of the stator 100.

In the exemplary embodiment shown in FIGS. 1 to 4, the coils 106 of the stator 100 are grouped, as previously mentioned, into three phase groups U, V, W, each phase group U, V, W including four respective coils 106U, 106V, 106W. Consequently, the exemplary stator 100 shown in FIG. 1 includes twelve stator teeth 104 and twelve respective coils 106 wound around the respective twelve teeth 104.

However, it is to be noted that neither the number of phase groups nor the number of coils associated with a given phase group is limited to the detailed numbers given above. Stators with a different number of coils and/or phase groups are also conceivable.

In the exemplary stator 100, a coil 106U, 106V, 106W of a given phase group U, V, W may be arranged in the circumferential direction C of the stator 100 between two coils 106U, 106V, 106W of different phase groups U, V, W.

As shown in FIG. 1, the coils 106U, 106V, 106W of the U-phase group, the V-phase group, and the W-phase group may be arranged in the circumferential direction C of the stator 100 such that: each coil 106U of the U-phase group U follows a coil 106W of the W-phase group W and is followed by a coil 106V of the V-phase group V, each coil 106V of the V-phase group V follows a coil 106U of the U-phase group U and is followed by a coil 106W of the W-phase group W, and each coil 106W of the W-phase group W follows a coil 106V of the V-phase group V and is followed by a coil 106U of the U-phase group U.

In the exemplary stator 100, one of the end wires 110U-1 of the U-phase group U and one of end wires 110V-2 of the V-phase group V may be arranged adjacently, the other end wire 110V-1 of the V-phase group V and one of end wires 110W-2 of the W-phase group W may be arranged adjacently, and the other end wire 110W-1 of the W-phase group W and the other end wire 110U-2 of the U-phase group U may be arranged adjacently. The sets of end wires 110U-1, 110U-2, 110V-1, 110V-2, 110W-1, 110W-2 of different phase groups U, V, W arranged adjacently may be positioned at regular angular intervals in the circumferential direction C of the stator 100, i.e. at angular intervals of 120 degrees.

To minimize the lengths of the wires of the respective phase groups U, V, W, i.e. the wires forming the respective coils 106U, 106V, 106W and the respective loop wires 108U, 108V, 108W that respectively connect consecutive coils 106U, 106V, 106W of the respective phase groups U, V, W, at least one loop wire 108U, 108V, 108W may extend substantially rectilinearly between two respective coils 106U, 106V, 106W of a given phase group U, V, W connected by said loop wire 108U, 108V, 108W. In an exemplary stator 100, a plurality of loop wires 108U, 108V, 108W or even all loop wires 108U, 108V, 108W may extend substantially rectilinearly between the respective coils 106U, 106V, 106W of the respective phase groups U, V, W.

A rectilinear extension in this respect does not necessarily mean that the respective loop wires 106U, 106V, 106W extend rectilinearly in a strict mathematical sense, but that the respective loop wires 108U, 108V, 108W may slightly deviate from a strict rectiliear extension as long as the lengths of the loop wires 108U, 108V, 108W do not considerably exceed the distance between two consecutive coils 106U, 106V, 106W of a given phase group U, V, W at a radially inner end portion. By loop wires with such lengths, a stator 100 with a compact structure may be provided, since no additional space has to be provided for receiving loop wires with excessive lengths.

At least one coil 106U, 106V, 106W or a plurality of coils 106U, 106V, 106W or even all coils 106U, 106V, 106W of the stator 100 may comprise a plurality windings. The number N of windings may range between about 10 to about 20.

The thickness of a winding wire may range between about 1 mm to about 2 mm.

At least one core tooth 104, a plurality of core teeth 104, or even all core teeth 104 may be made of a ferromagnetic material such as of ferromagnetic steel.

The winding senses of the plurality of coils 106U, 106V, 106W of at least one phase group U, V, W may be identical. In this way, the respective coils 106U, 106V, 106W may be manufactured in a simple way, e.g., by rotating the respective teeth 104 by means of a winding apparatus in the same rotation direction.

In an exemplary embodiment, at least one end wire 110U-1, 110U-2, 110V-1, 110V-2, 110W-1, 110W-2 and at least one loop wire 108U, 108V, 108W may extend on the same axial side of the stator core 102. In this way, a stator 100 with small axial dimensions may be provided.

However, it should not be excluded that at least one end wire 110U-1, 110U-2, 110V-1, 110V-2, 110W-1, 110W-2 and at least one loop wire 108U, 108V, 108W may extend on different axial sides of the stator core 102. In this way, the space on both axial sides of the stator 102 may be efficiently utilized for positioning the loop wires 108U, 108V, 108W and the end wires 110U-1, 110U-2, 110V-1, 110V-2, 110W-1, 110W-2. Such a configuration is indicated in FIG. 2 where the loop wires 108U, 108V, 108W and some of the end wires 110 are positioned on different axial sides of the stator 100.

The coils 106U, 106V, 106W, i.e. the winding wires forming the coils 106U, 106V, 106W, may be directly wound around the respective winding portions 104a of the teeth 104, i.e. the coils 106U, 106V, 106W are in physical contact with the winding portions 104a of the teeth 104. In order to avoid a short circuit between the windings of a coil 106U, 106V, 106W or between different coils 106U, 106V, 106W in case the stator teeth 104 are made of an electrically conductive material such as of electromagnetic steel, at least one tooth 104, a plurality of teeth 104 or even all teeth 104 may be equipped, as shown in FIGS. 2 to 4, with an insulating member 112 made of an electrically insulating material and interposed at least between the tooth 104 and a respective coil 106U, 106V, 106W. The electrical conductivity of the insulating material may be less than $10^{-8}$ S/m.

The insulating member 112 may include a tubular portion 112a extending in the radial direction R of the stator 100 and surrounding the winding portion 104a of the respective core tooth 104. The respective coil 106 may be wound around the tubular portion 112a of the insulating member 112. In FIG. 2, the tubular portions 112a of the insulating members 112 are not visible, since the coils 106 are wound around them. For this reason, the line indicating the position of the tubular portion 112a in FIG. 2 is drawn as a dashed line.

The insulating member 112 may also include a protruding portion 112b at a radially inner end of the stator 100 protruding beyond the tubular portion 112a in the axial direction A of the stator 100. Even though not shown in the figures, the radially inner protruding portion 112b may protrude beyond the tubular portion 112a on opposite axial sides thereof. The protruding portion 112b at the radially inner end of the stator 100 may serve as a positioning means for the respective coil 106 wound around the tubular portion 112a of the insulating member 112.

As also shown in FIG. 2, the insulating member 112 may further include a protruding portion 112c at a radially outer end of the stator 100 protruding beyond the tubular portion 112a in the axial direction A of the stator 100. As shown in FIG. 2, the protruding portion 112c provided at the radially outer end of the stator 100 protrudes beyond the tubular portion 112a on opposite axial sides thereof. The protruding portion 112c at the radially outer end of the stator 100 may electrically insulate the respective coil 106 from the flange portion 104b of the respective stator tooth 104.

The radially inner protruding portion 112b may include a recess 114 in an axial end portion thereof. The axial recess 114 may be provided at least on an axial side of the stator 100 on which a corresponding loop wire 108U, 108V, 108W is arranged. In such a configuration, the axial recess 114 may be used as a positioning means for a respective loop wire 108U, 108V, 108W, i.e. the loop wire 108U, 108V, 108W may extend through the axial recess 114 of the radially inner protruding portion 112b as clearly shown in FIGS. 2 and 4.

As shown in FIG. 2, the radially outer protruding portion 112c may also include at least one recess 116 at an axial end thereof. The radially outer protruding portion 112c may even include a plurality of recesses 116 at one axial end thereof. The at least one recess 116 at the axial end portion may also serve as a positioning means for positioning an end wire, e.g. the end wires 110 shown in FIG. 2. These end wires 110 may be bent such as to extend substantially only in the radial direction of the stator 100, and to be respectively passed through one of the axial recesses 116.

The stator 100 may further include a plurality of busbars 118A, 118B, 118C electrically connected to respective end wires 110U-1, 110U-2, 110V-1, 110V-2, 110W-1, 110W-2.

As shown in FIG. 1, each busbar 118A, 118B, 118C may include: at least one wire connection terminal member 120A-1, 120A-2, 120B-1, 120B-2, 120C-1, 1200-2 respectively electrically connected to an end wire 110U-1, 110U-2, 110V-1, 110V-2, 110W-1, 110W-2, and at least one power source connection terminal member 122A, 122B, 122C configured to be electrically connected to a power source (not shown).

In the exemplary embodiment shown in FIG. 1, the stator 100 includes three busbars 118A, 118B, 118C, each of them including two wire connection terminal members 120A-1 and 120A-2, 120B-1 and 120B-2, and 120C-1 and 120C-2, respectively. The wire connection terminal members 120A-1, 120A-2 of a first busbar 118A may be electrically connected to one of the end wires 110U-1 of the U-phase group U and to one of the end wires 110V-2 of the V-phase group V, respectively. The wire connection terminal members 120B-1, 120B-2 of a second busbar 118B may be electrically connected to the respective other one of the end wires 110V-1 of the V-phase group V and to one of the end wires 110W-2 of the W-phase group W, respectively. The wire connection terminal members 120C-1, 1200-2 of a third busbar 118C may be electrically connected to the respective other one of the end wires 110W-1 of the W-phase group W and to the respective other one of the end wires 110U-2 of the U-phase group U. In this way, a delta connection of the coils 106U, 106V, 106W may be realized.

As shown in FIG. 1, at least one end wire 110U-1, 110U-2, 110V-1, 110V-2, 110W-1, 110W-2 may extend between a respective end coil 106UE-1, 106UE-2, 106VE-1, 106VE-2, 106WE-1, 106WE2 and a respective wire connection terminal member 120A-1, 120A-2, 120B-1, 120B-2, 120C-1, 1200-2 basically only in the radial direction R of the stator 100. In this way, end wires 110U-1, 110U-2, 110V-1, 110V-2, 110W-1, 110W-2 with short lengths may be realized and, therefore, wire material can be saved as compared to an end wire 110U-1, 110U-2, 110V-1, 110V-2, 110W-1, 110W-2 extending at least in part in the circumferential direction C of the stator 100.

However, it shall not be excluded that at least one end wire 110U-1, 110U-2, 110V-1, 110V-2, 110W-1, 110W-2 may also extend at least in part in the circumferential direction C of the stator 100, e.g. on an axial side of the flange portions 104b.

Figure 5:
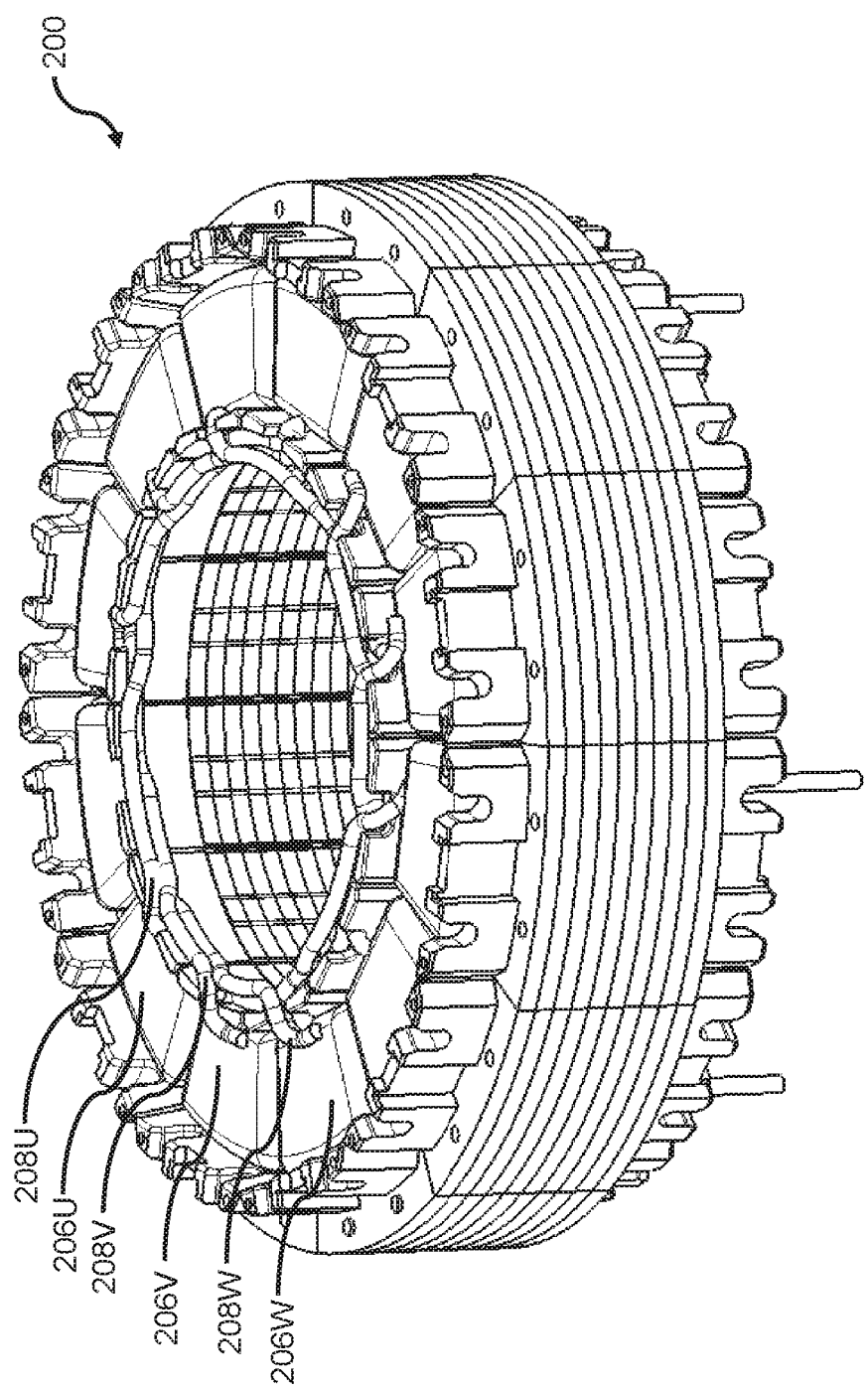
FIG. 5 shows a perspective view of a modified stator.
Figure 6:
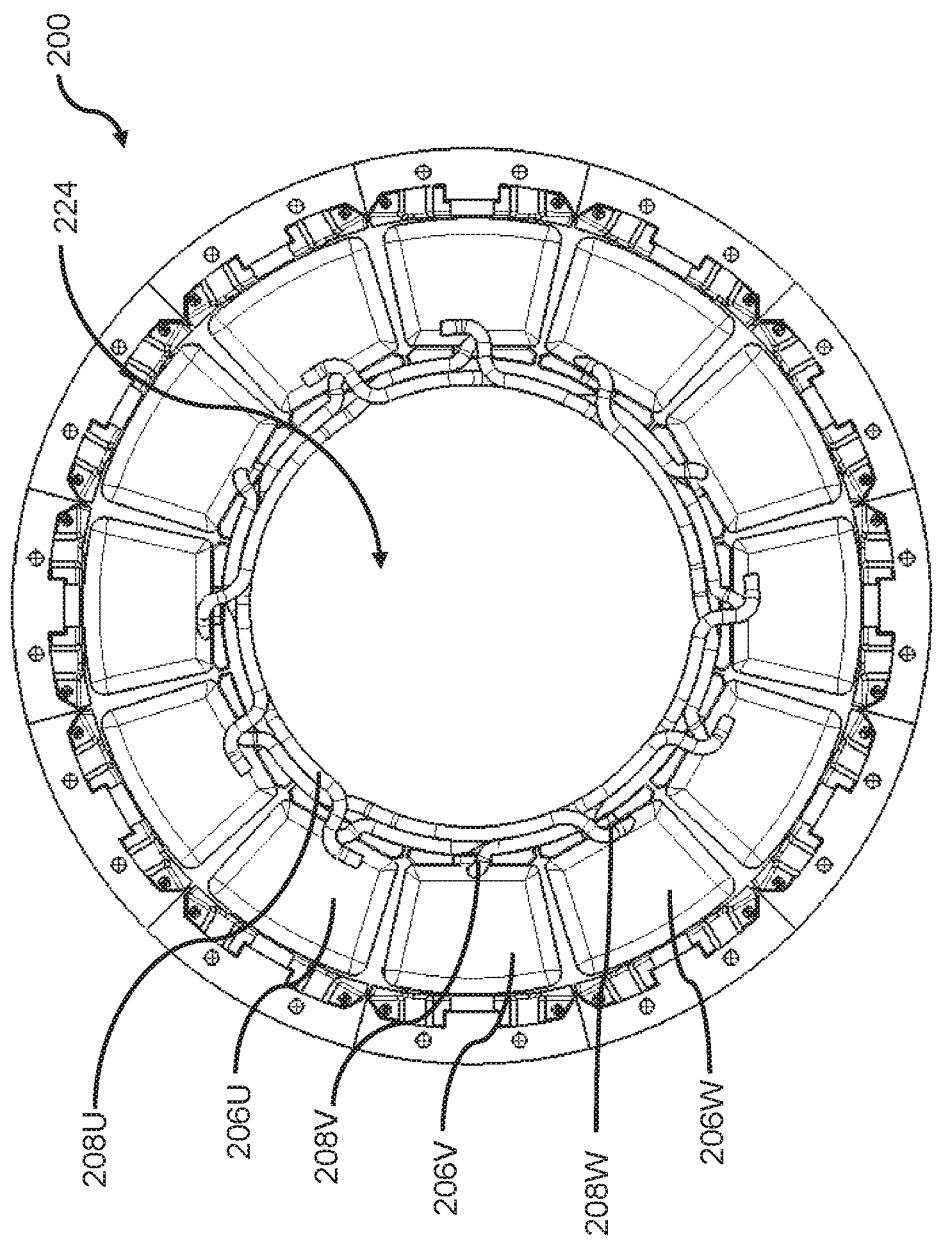
FIG. 6 shows a top view of the stator shown in FIG. 5.
Figure 7:
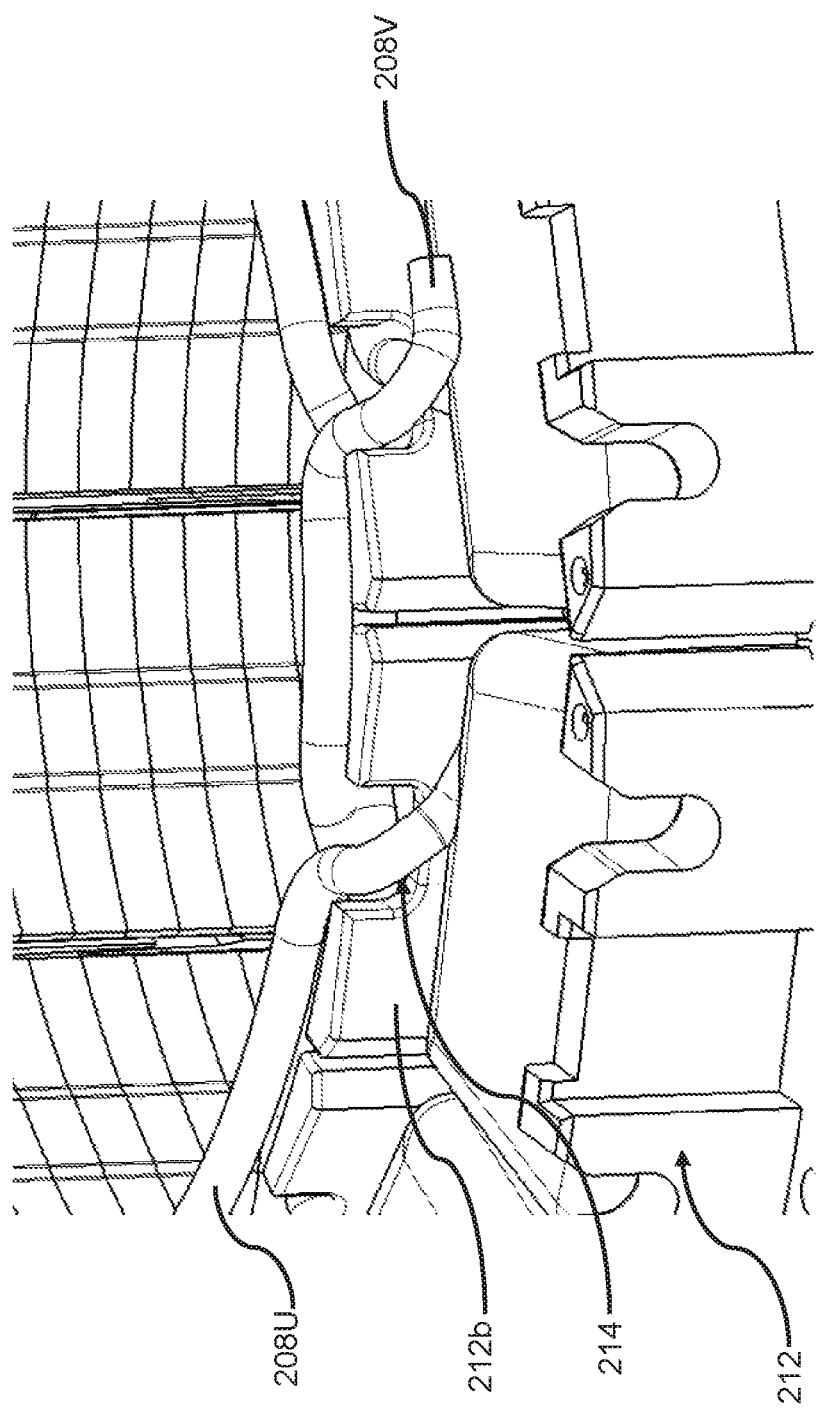
FIG. 7 shows an enlarged view of an outer circumferential portion of the stator shown in FIGS. 5 and 6.

In FIGS. 5 to 7, a modified stator 200 is shown. The stator 200 will be in the following explained only inasmuch as it differs from the stator 100 previously described. Elements corresponding to elements of the stator 100 will be provided with the same reference numerals, however, enhanced by the number 100.

As clearly shown in FIGS. 5 and 6, the stator 200 differs from the stator 100 described above in view of the configuration of the loop wires 208U, 208V, 208W. Similar to the stator 100 described above, the loop wires 208U, 208V, 208W are also positioned at a radially inner portion of the stator 200. In contrast to the stator 100, the loop wires 208U, 208V, 208W do not extend rectilinearly between respective coil 206U, 206V, 206W, but substantially in the circumferential direction of the stator 200. In this way, the radially inner opening 224 of the stator 200 is substantially free of any wires. Hence, a stator 200 configured in this way, may be adapted to receive a rotor in the inner opening 224 with larger radial dimensions as compared to a rotor receivable in the inner opening 124 of the stator 100.

As shown in FIG. 7, the loop wires may also be positioned in a recess 214 formed at a radially inner protruding portion 212b of an insulating member 212.

A method of manufacturing the stators 100, 200 will be subsequently described. Since, as previously discussed, the stators 100 and 200 differ from each other only in view of the configuration of the loop wires, reference will be made in the subsequent description of the method only to the stator 100.

The method may include: providing a plurality of sets of consecutively arranged separate stator teeth 104, winding respective winding wires around the teeth 104 of the respective sets of stator teeth 104 to form a plurality of sets of consecutively arranged coils 106 wound around the teeth 104, and to connect two immediately consecutive coils 106 of the respective sets by a respective loop wire 108U, 108V, 108W, joining the different sets of teeth 104 to an annular structure such that at least one of the loop wires 108U, 108V, 108W is positioned at a radially inner portion of the annular structure, and fixing the teeth 104 to each other.

The individual sets of teeth correspond to those teeth 104 around which respective coils 106U, 106V, 106W of a given phase group U, V, W are wound. In case of the above-described stator 100 with twelve teeth 104 and three phase groups U, V, W, a set of teeth 104 may include four core teeth 104.

The winding of a winding wire around the core teeth 104 of a given set may be performed by rotating the respective teeth 104 around a longitudinal axis. During the winding the winding wire around the teeth 104, the teeth 104 may be positioned in a substantially circular configuration, i.e. they may be positioned along a substantially circular path, e.g. by means of a circular holder having a plurality of holding portions for holding the respective teeth 104 therein. The holder may be rotatable about a central axis thereof for successively positioning the respective teeth 104 in a winding position of the holder in which the winding wire may be wound around a tooth 104 by rotating the tooth 104 around its longitudinal axis. After having wound a predetermined number N of windings around the respective tooth 104, the holder may be rotated by a predetermined angle around its axis for positioning another tooth in the winding position of the holder. By rotating the holder, the winding wire may be guided between the two consecutive teeth 104, thereby forming a respective loop wire 108U, 108V, 108W.

Each tooth 104 positioned in the winding position of the holder may be rotated in the same sense in order to wind the winding wire around the teeth 104 in the same winding direction.

In case the teeth 104 are equipped with an above-described insulating member 112, the winding wire may be wound around the respective insulating member 112. In case at least one insulating member 112 includes a radially inner protruding portion 112b with a recess 114 at an axial end portion thereof, a respective loop wire 108U, 108V, 108W may be passed through said recess 114 during the winding the winding wire.

In case the insulating member 112 also includes a radially outer protruding portion 112c with a recess 116 formed at an axial end portion thereof, the method may further include passing an end portion of the winding wire that forms a respective end wire through said recess 116. The end portion of the winding wire may be passed such that it substantially extends only in the radial direction.

The teeth 104 of a given set of teeth 104 are spaced apart from each other in the circumferential direction in order to accommodate further teeth 104 of different sets of teeth therebetween when joining the different sets of teeth 104 to the annular structure. The teeth 104 of the different sets of teeth 104 may be joined such that a tooth 104 of a given set of teeth 104 is positioned between teeth 104 of different sets of teeth 104 in the circumferential direction of the annular structure. In this way, the above-described arrangement of the corresponding coils 106U, 106V, 106W of the respective phase groups U, V, W in the circumferential direction C of the stator 100 may be achieved.

A further degree of freedom with respect of the relative arrangement of the different sets of teeth 104 and respective coils 106 when joining them to the above-mentioned annular structure exists in view of the positions of the end wires of the different sets of coils 106U, 106V, 106W wound around the teeth 104 of the different sets of teeth 104.

Figure 8A:
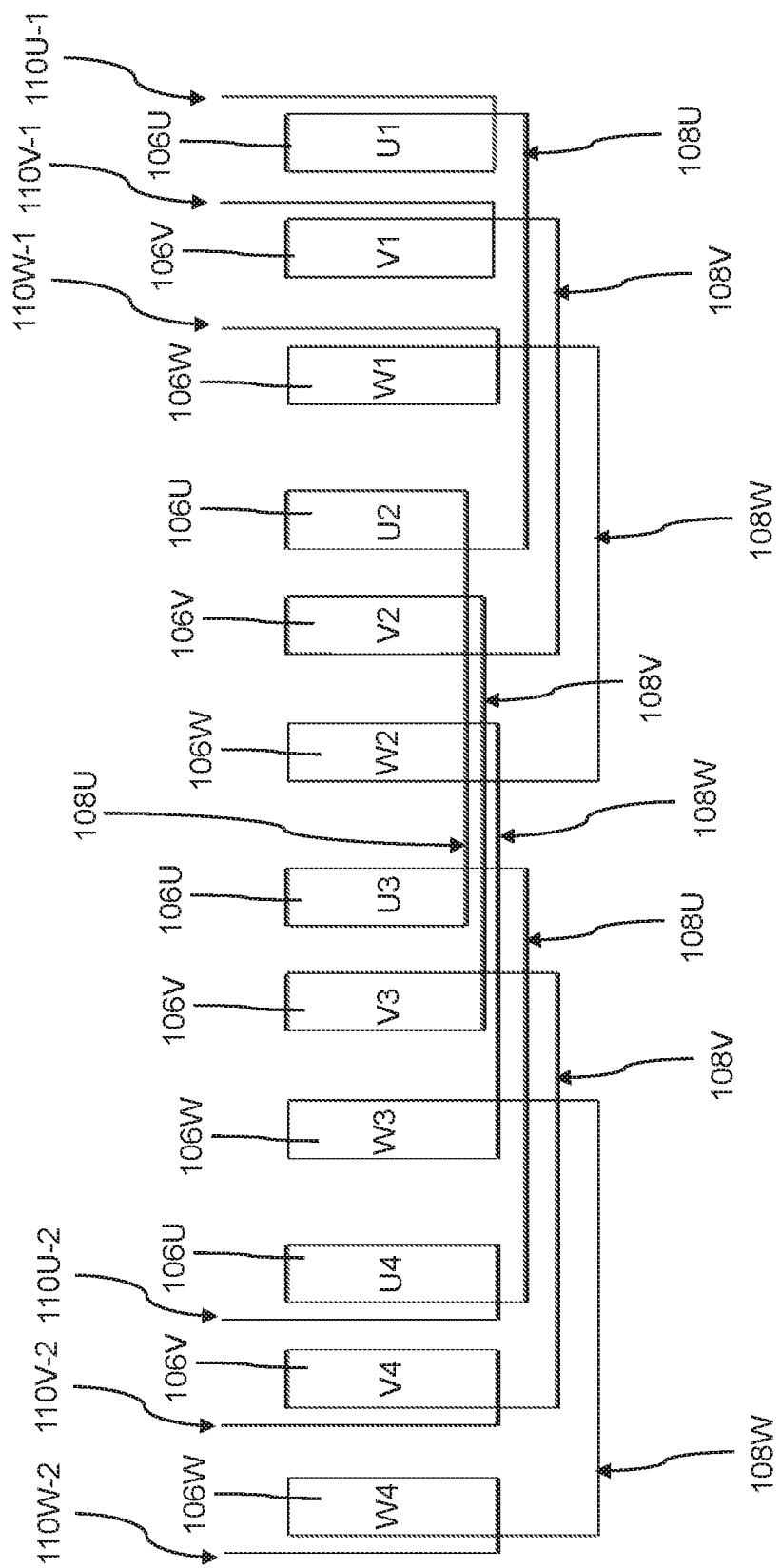
FIG. 8A illustrates a winding scheme of winding a winding wire around the teeth of a stator core.

One option in this respect is shown in FIG. 8A. This figure shows a planar projection of three sets of coils joined to an annular structure. This means that in the corresponding annular structure the left and right ends shown in FIG. 8A are positioned adjacently.

As indicated in FIG. 8A, the end wires 110U-1, 110V-1, 110W-1, 110U-2, 110V-2, 110W-2 are positioned in the corresponding annular structure adjacently in a small angular portion of the stator 100 in the circumferential direction thereof.

Figure 8B:
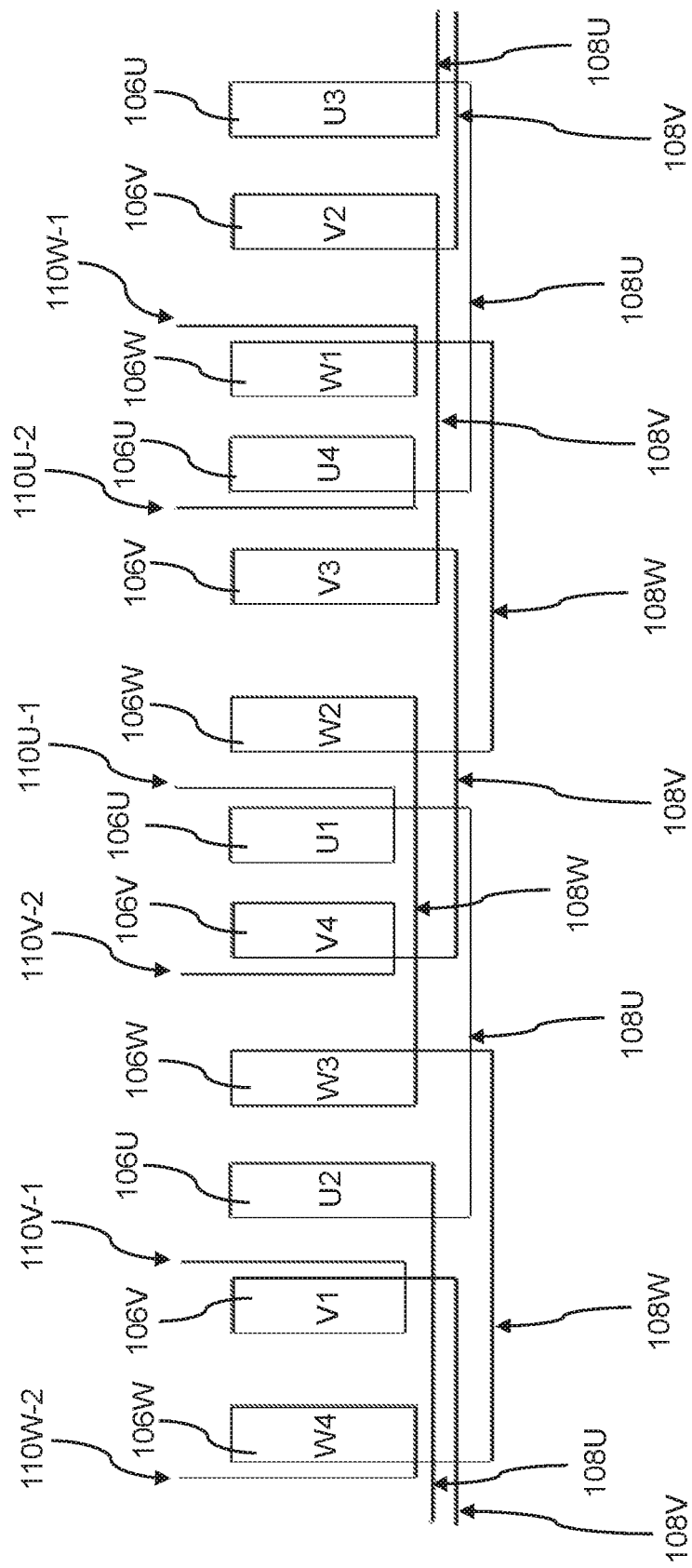
FIG. 8B illustrates an alternative winding scheme.

Another option of positioning the different sets of coils relative to each other is shown in FIG. 8B. Similar to FIG. 8A, FIG. 8B also shows a planar projection of three sets of coils joined to an annular structure. This means that the left wire ends in FIG. 8B are joined to the right wire ends in this figure in the corresponding annular configuration.

The arrangement shown in FIG. 8B substantially corresponds to the arrangement of FIG. 1. This means that an end wire 110U-1 of the U-phase group U and an end wire 110V-2 of the V-phase group V are positioned adjacently in the circumferential direction of the stator, the other end wire 110U-2 of the U-phase group U and one end wire 110W-1 of the W-phase group W are positioned adjacently, and the other end wire 110V-1 of the V-phase group V and the other end wire 110W-2 of the W-phase group are positioned adjacently in the circumferential direction. In the scheme shown in FIG. 8B, the different sets of adjacently positioned end wires may be arranged in circumferential direction of the stator 100 at substantially regular intervals like in FIG. 1.

Before fixing the teeth 104 to each other, a pressure may be exerted onto the teeth 104 to bring the circumferential end surfaces of adjacent teeth 104, e.g. of the respective flange portions 104b of the teeth 104, into mutual tight contact. In this way, a stator with a well-defined annular shape may be manufactured. In addition, the subsequent fixing of adjacently positioned teeth 104 may be performed in a simple way, since the respective teeth 104 have a well-defined relative position. The fixing may be performed by welding, soldering, or any other suitable fixing method.

In the following, various aspects of this disclosure will be illustrated:

Example 1 is a stator for an electric motor. The stator may have a substantially annular shape centered around a central axis and may include a stator core having a plurality of teeth consecutively arranged in a circumferential direction of the stator, and a plurality of coils wound around respective teeth of the plurality of teeth. The plurality of coils may be grouped into a plurality of phase groups. The stator may include in association with the respective phase groups: at least one loop wire connecting at least two coils of the respective phase group in series to each other with the at least one loop wire positioned at a radially inner portion of the stator, and at least two end wires respectively connected to two end coils of the respective phase group. The at least two end wires are configured to be connected to a power source to energize the coils of the respective phase group.

In Example 2, the subject matter of Example 1 can optionally further include that the plurality of phase groups includes a U-phase group, a V-phase group, and a W-phase group.

In Example 3, the subject matter of Example 2 can optionally further include that each phase group includes four coils and the stator core has twelve teeth with respective coils wound around them.

In Example 4, the subject matter of any one of Examples 1 to 3 can optionally further include that a coil of a given phase group is arranged in the circumferential direction of the stator between two coils of different phase groups.

In Example 5, the subject matter of Example 4 and of one of Examples 2 or 3 can optionally further include that the coils of the U-phase group, the V-phase group, and the W-phase group are arranged in the circumferential direction of the stator such that: each coil of the U-phase group follows a coil of the W-phase group and is followed by a coil of the V-phase group, each coil of the V-phase group follows a coil of the U-phase group and is followed by a coil of the W-phase group, and each coil of the W-phase group follows a coil of the V-phase group and is followed by a coil of the U-phase group.

In Example 6, the subject matter of any one of Examples 1 to 5 can optionally further include that all coils of each phase group are serially connected to each other by loop wires.

In Example 7, the subject matter of any one of Examples 2 to 6 can optionally further include that one of the end wires of the U-phase group and one of end wires of the V-phase group are arranged adjacently, the other end wire of the V-phase group and one of end wires of the W-phase group are arranged adjacently, and the other end wire of the W-phase group and the other end wire of the U-phase group are arranged adjacently. The sets of end wires of different phase groups arranged adjacently may be positioned at regular angular intervals of 120 degrees in the circumferential direction of the stator.

In Example 8, the subject matter of any one of Examples 1 to 7 can optionally further include that at least one loop wire extends substantially rectilinearly between two respective coils of a given phase group connected by the at least one loop wire.

In Example 9, the subject matter of any one of Examples 1 to 8 can optionally further include that the winding senses of the plurality of coils of a phase group are identical.

In Example 10, the subject matter of any one of Examples 1 to 9 can optionally further include that at least one end wire extends on an axial side of the stator core on which the at least one loop wire is arranged.

In Example 11, the subject matter of any one of Examples 1 to 10 can optionally further include that at least one end wire extends on an axial side of the stator core opposite to the axial side of the stator core on which the at least one loop wire is arranged.

In Example 12, the subject matter of any one of Examples 1 to 11 can optionally further include an insulating member made of an electrically insulating material and interposed at least between a tooth of the stator core and a respective coil.

In Example 13, the subject matter of Example 12 can optionally further include that the insulating member includes: a tubular portion extending in the radial direction of the stator with a respective coil wound around the tubular portion, and a protruding portion at a radial inner end of the stator, the protruding portion protruding beyond the tubular portion in the axial direction of the stator.

In Example 14, the subject matter of Example 13 can optionally further include that the protruding portion includes a recess in an axial end portion thereof on the axial side of the stator on which the at least one loop wire is arranged, wherein the at least one loop wire extends through the recess.

In Example 15, the subject matter of any one of Examples 1 to 14 can optionally further include a busbar or a busbar unit including a plurality of busbars, the busbar or each busbar being electrically connected to at least one of the end wires.

In Example 16, the subject matter of Example 15 can optionally further include that the busbar or each busbar includes: at least one wire connection terminal member electrically connected to the at least one end wire, and at least one power source connection terminal member configured to be electrically connected to a power source.

In Example 17, the subject matter of Examples 2 and 16 can optionally further include three busbars which respectively include two wire connection terminal members. The wire connection terminal members of a first busbar may be electrically connected to one of the end wires of the U-phase group and to one of the end wires of the V-phase group, respectively, the wire connection terminal members of a second busbar may be electrically connected to the respective other one of the end wires of the V-phase group and to one of the end wires of the W-phase group, respectively, and the wire connection terminal members of a third busbar may be electrically connected to the respective other one of the end wires of the W-phase group and to the respective other one of the end wires of the U-phase group.

In Example 18, the subject matter of any one of Examples 16 or 17 can optionally further include that at least one end wire extends between a respective end coil and a respective wire connection terminal member at least in part in the circumferential direction of the stator.

In Example 19, the subject matter of any one of Examples 16 to 18 can optionally further include that at least one end wire extends between a respective end coil and a respective wire connection terminal member basically only in the radial direction of the stator.

Example 20 is an electric motor, including: a housing, a stator of any one of Examples 1 to 19 fixedly mounted inside of the housing and configured to generate a time-varying magnetic field by means of the coils, and a rotor rotatably mounted inside of the housing and configured to be rotated by an interaction with the time-varying magnetic field generated by the stator.

Example 21 is a hydraulic pump including an electric motor of Example 20.

In Example 22, the subject matter of Example 21 may be configured as an electric oil pump or as an electric water pump.

Example 23 is a method of manufacturing a stator of any one of Examples 1 to 19. The method may include: providing a plurality of sets of consecutively arranged separate stator teeth, winding respective winding wires around the teeth of the respective sets of stator teeth to form a plurality of sets of consecutively arranged coils wound around the teeth, and to connect two immediately consecutive coils of the respective sets by a respective loop wire, joining the different sets of teeth to an annular structure such that at least one of the loop wires is positioned at a radially inner portion of the annular structure, and fixing the teeth to each other.

In Example 24, the subject matter of Example 23 can optionally further include that the teeth of the different sets of teeth are joined such that a tooth of a given set of teeth is positioned between teeth of different sets of teeth in the circumferential direction of the annular structure.

In Example 25, the subject matter of any one of Examples 23 or 24 can optionally further include that the winding wire is wound around the teeth of a given set of teeth in the same winding direction.

In Example 26, the subject matter of any one of Examples 23 to 25 can optionally further include that the stator teeth are consecutively arranged along a substantially circular path during the winding the winding wire around them.

In Example 27, the subject matter of any one of Examples 23 to 26 can optionally further include, before fixing the teeth to each other, exerting a pressure onto the teeth to bring circumferential end surfaces of adjacent teeth into mutual tight contact.

In Example 28, the subject matter of any one of Examples 23 to 27 can optionally further include that at least one tooth includes an insulating member around which the coil is wound, the insulating member including a protrusion having a recess formed therein. The loop wire may be passed through the recess during the winding the winding wire.

In Example 29, the subject matter of any one of Examples 23 to 28 can optionally further include that the sets of teeth are joined to the annular structure such that at least one end of at least one winding wire extends substantially only in a radial direction of the annular structure.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A stator for an electric motor, the stator having a substantially annular shape centered around a central axis, and the stator comprising:
    a stator core having a plurality of teeth consecutively arranged in a circumferential direction; and
    a plurality of coils wound around respective teeth of the plurality of teeth, the plurality of coils being grouped into a plurality of phase groups,
    wherein the stator comprises in association with a respective phase group of the plurality of phase groups:
    at least one loop wire connecting at least two coils of the respective phase group in series to each other, the at least one loop wire being positioned at a radially inner portion of the stator, and
    at least two end wires respectively connected to two end coils of the respective phase group, the at least two end wires being configured to connect to a power source to energize the at least two coils of the respective phase group.

2. The stator of claim 1, wherein
the plurality of phase groups comprise a U-phase group, a V-phase group, and a W-phase group.

3. The stator of claim 2, wherein
each phase group of the plurality of phase groups comprises four coils,
the stator core has twelve teeth, and
respective coils are wound around the twelve teeth.

4. The stator of claim 1, wherein
a coil of a given phase group of the plurality of phase groups is arranged in the circumferential direction between two coils of different phase groups among the plurality of phase groups.

5. The stator of claim 2, wherein
the at least two coils of the U-phase group, the V-phase group, and the W-phase group are arranged in the circumferential direction such that:
each coil of the U-phase group follows a coil of the W-phase group and is followed by a coil of the V-phase group,
each coil of the V-phase group follows a coil of the U-phase group and is followed by a coil of the W-phase group, and
each coil of the W-phase group follows a coil of the V-phase group and is followed by a coil of the U-phase group.

6. The stator of claim 1, wherein
all coils of each phase group of the plurality of phase groups are serially connected to each other by loop wires.

7. The stator of claim 2, wherein
one of the end wires of the U-phase group and one of the end wires of the V-phase group are arranged adjacently,
the other end wire of the V-phase group and one of the end wires of the W-phase group are arranged adjacently,
the other end wire of the W-phase group and the other end wire of the U-phase group are arranged adjacently, and
sets of end wires of different phase groups arranged adjacently are positioned at regular angular intervals of 120 degrees in the circumferential direction.

8. The stator of claim 1, wherein
at least one loop wire extends substantially rectilinearly between two respective coils of a given phase group of the plurality of phase groups, and
the two respective coils are connected by the at least one loop wire.

9. The stator of claim 1, wherein
winding senses of the at least two coils of a phase group of the plurality of phase groups are identical.

10. The stator of claim 1, wherein
at least one end wire of the end wires extends on an axial side of the stator core on which the at least one loop wire is arranged.

11. The stator of claim 1, wherein
at least one end wire of the end wires extends on an axial side of the stator core opposite to the axial side of the stator core on which the at least one loop wire is arranged.

12. The stator of claim 1, further comprising:
an insulating member including an electrically insulating material, the insulating member being interposed at least between a tooth of the stator core and a respective coil.

13. The stator of claim 12, wherein
the insulating member comprises:
- a tubular portion extending in a radial direction of the stator, wherein a respective coil of the at least two coils is wound around the tubular portion, and
- a protruding portion at a radial inner end of the stator, the protruding portion extending beyond the tubular portion in an axial direction of the stator.

14. The stator of claim 13, wherein
the protruding portion comprises
- a recess in an axial end portion thereof on an axial side of the stator on which the at least one loop wire is arranged,
- wherein the at least one loop wire extends through the recess.

15. The stator of claim 1, further comprising:
a busbar, or
a busbar unit comprising a plurality of busbars,
wherein the busbar or each busbar of the plurality of busbars is electrically connected to at least one of the end wires.

16. The stator of claim 15, wherein
the busbar or each busbar of the plurality of busbars comprises:
- at least one wire connection terminal member electrically connected to the at least one end wire, and
- at least one power source connection terminal member configured to electrically connect to a power source.

17. The stator of claim 2, further comprising:
three busbars, each of the three busbars including two wire connection terminal members, wherein:
the wire connection terminal members of a first busbar of the three busbars are electrically connected to one of the end wires of the U-phase group and to one of the end wires of the V-phase group, respectively,
the wire connection terminal members of a second busbar of the three busbars are electrically connected to the other end wire of the V-phase group and to one of the end wires of the W-phase group, respectively, and
the wire connection terminal members of a third busbar of the three busbars are electrically connected to the other end wire of the W-phase group and to the other end wire of the U-phase group, respectively.

18. The stator of claim 16, wherein
at least one end wire of the end wires extends between a respective end coil and a respective wire connection terminal member at least in part in the circumferential direction.

19. The stator of claim 16, wherein
at least one end wire of the end wires extends between a respective end coil and a respective wire connection terminal member substantially in a radial direction of the stator.

20. An electric motor, comprising:
a housing;
a stator of claim 1 fixedly mounted inside of the housing, and the stator being configured to generate a time-varying magnetic field by means of the plurality of coils; and
a rotor mounted inside of the housing, the rotor being configured to rotate by an interaction with the time-varying magnetic field generated by the stator.

21. A hydraulic pump, comprising an electric motor of claim 20.

22. The hydraulic pump of claim 21, wherein
the hydraulic pump is an electric oil pump or an electric water pump.

* * * * *

UNITED STATES PATENT AND TRADEMARK OFFICE
CERTIFICATE OF CORRECTION

PATENT NO.       : 10,581,302 B2
APPLICATION NO.  : 15/787793
DATED            : March 3, 2020
INVENTOR(S)      : Juergen Schmid It is certified that error appears in the above-identified patent and that said Letters Patent is hereby corrected as shown below:

In the Specification

"Column 6, Line 14, change '1200-2' to -- 120C-2 --."
"Column 6, Line 33, change '1200-2' to -- 120C-2 --."
"Column 6, Line 44, change '1200-2' to -- 120C-2 --."

Signed and Sealed this
Twenty-fifth Day of August, 2020

Andrei Iancu
*Director of the United States Patent and Trademark Office*